United States Patent
Spalt

(10) Patent No.: US 9,131,044 B2
(45) Date of Patent: Sep. 8, 2015

(54) METHOD FOR ACTIVATION OF AT LEAST ONE FURTHER EAVESDROPPING MEASURE IN AT LEAST ONE COMMUNICATION NETWORK

(75) Inventor: Bernhard Spalt, Vienna (AT)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 1590 days.

(21) Appl. No.: 11/992,248

(22) PCT Filed: Aug. 24, 2006

(86) PCT No.: PCT/EP2006/065626
§ 371 (c)(1),
(2), (4) Date: Mar. 19, 2008

(87) PCT Pub. No.: WO2007/033881
PCT Pub. Date: Mar. 29, 2007

(65) Prior Publication Data
US 2010/0094987 A1    Apr. 15, 2010

(30) Foreign Application Priority Data
Sep. 19, 2005    (DE) .......................... 10 2005 044 798

(51) Int. Cl.
*G06F 15/173* (2006.01)
*H04M 3/22* (2006.01)
*H04L 12/26* (2006.01)
(Continued)

(52) U.S. Cl.
CPC ......... *H04M 3/2281* (2013.01); *H04L 12/2602* (2013.01); *H04L 43/00* (2013.01); *H04L 63/00* (2013.01); *H04L 63/30* (2013.01); *H04M 7/006* (2013.01)

(58) Field of Classification Search
USPC ....................................................... 709/224
See application file for complete search history.

(56) References Cited

U.S. PATENT DOCUMENTS 6,240,187 B1 * 5/2001 Lewis ........................... 380/282
6,542,739 B1 * 4/2003 Garner ......................... 455/427
(Continued)

FOREIGN PATENT DOCUMENTS

DE    101 06 351 A1    9/2002
DE    103 23 006 A1    12/2003
(Continued)

*Primary Examiner* — Richard G Keehn
(74) *Attorney, Agent, or Firm* — Squire Patton Boggs (US) LLP

(57) ABSTRACT

In a packet-switching and/or cell-switching communication network which comprises a plurality of switching nodes and in which the individual switching nodes in the communication network are each allocated a unique identification, eavesdropping measures are provided in order to eavesdrop on at least one data link that has been formed between two communication subscribers, in which case one of the two communication subscribers is identified by means of at least one eavesdropping measure as a communication subscriber to be eavesdropped on. The switching nodes which are intended for activation of eavesdropping measures are each allocated at least one activation database which has the identifications of the switching nodes which are enabled for activation of further eavesdropping measures. In this case, a further eavesdropping measure is activated in the switching node to be eavesdropped on only if the identification of the switching node to be eavesdropped on matches at least one identification which is contained in the activation database.

28 Claims, 2 Drawing Sheets

Figure 1:
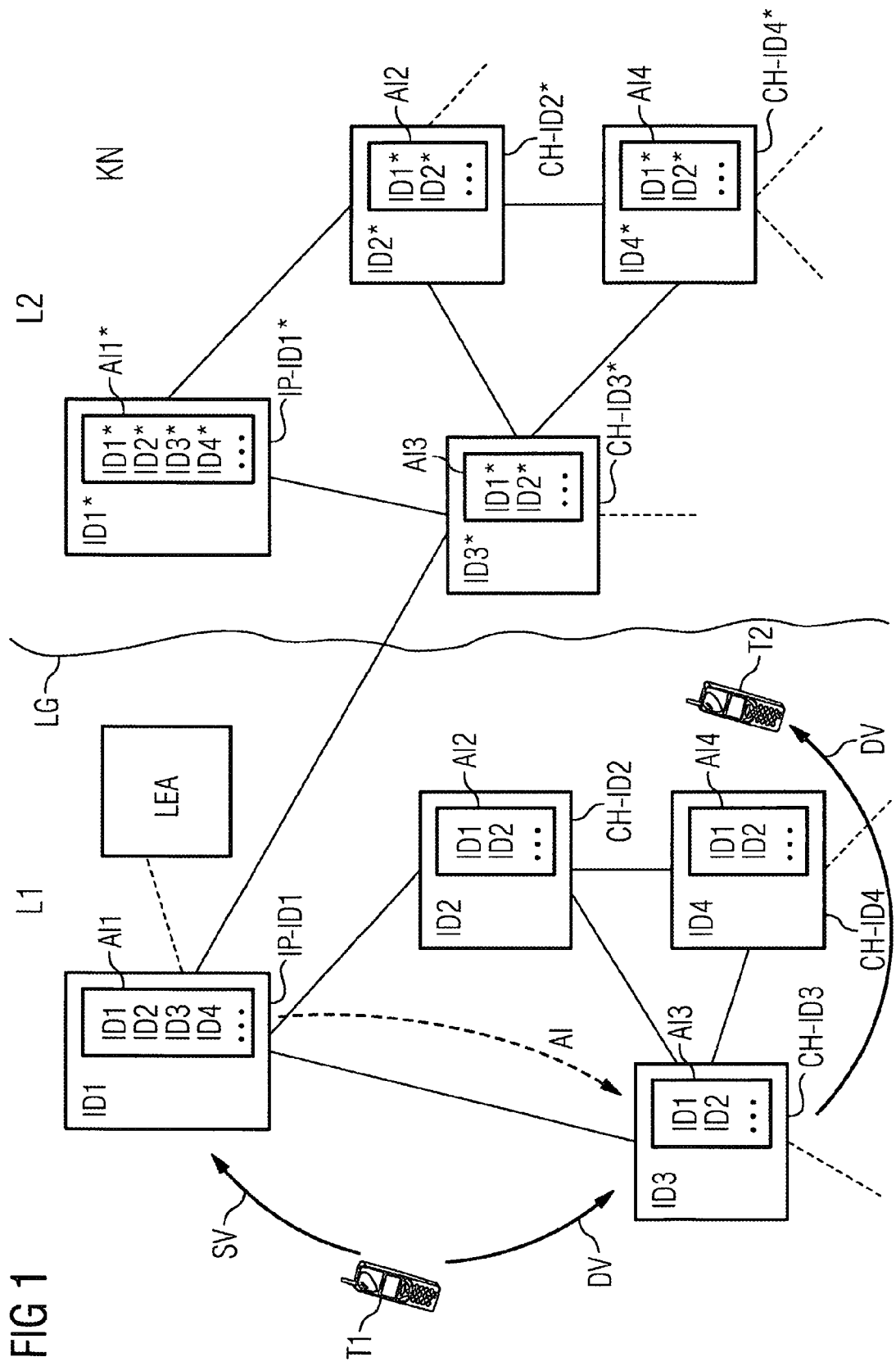

(51) Int. Cl.
*H04L 29/06* (2006.01)
*H04M 7/00* (2006.01)

(56) References Cited

U.S. PATENT DOCUMENTS

| | | | |
|---|---|---|---|
| 6,577,710 B1 * | 6/2003 | Eder et al. | 379/15.01 |
| 7,200,673 B1 * | 4/2007 | Augart | 709/238 |
| 7,474,874 B2 * | 1/2009 | Lahetkangas et al. | 455/41.2 |
| 2004/0136365 A1 * | 7/2004 | Eltschka et al. | 370/359 |
| 2004/0208165 A1 * | 10/2004 | Cai et al. | 370/352 |
| 2006/0165060 A1 * | 7/2006 | Dua | 370/352 |
| 2007/0010239 A1 * | 1/2007 | Connelly | 455/423 |

FOREIGN PATENT DOCUMENTS

| | | |
|---|---|---|
| EP | 1 389 862 A1 | 2/2004 |
| EP | 1 389 864 | 2/2004 |
| WO | 99/27716 | 6/1999 |

* cited by examiner

METHOD FOR ACTIVATION OF AT LEAST ONE FURTHER EAVESDROPPING MEASURE IN AT LEAST ONE COMMUNICATION NETWORK

The invention relates to a method for activating at least one further eavesdropping measure in at least one communication network in accordance with the preamble of patent claim 1.

The provision of eavesdropping functionalities within a public or private communication network is demanded of the network operators (telecommunication service providers=TSP) and the Internet service providers (ISP) more and more frequently by the competent national and federal authorities. The national laws and international agreements provided for this purpose allow what are known as consumers, for example the criminal investigation department, the secret service etc., to eavesdrop on or monitor the telecommunication traffic of a communication subscriber under suspicion while observing the respective applicable legal regulations for protecting communication subscribers (e.g. judicial warrant).

The publications TS 33.107 and TS 33.108 (in this regard see www.3gpp.org) reveal eavesdropping measures ("interception") in which, for the purpose of eavesdropping on communication data ("communication contents"), preferably audio, video or multimedia data and also short messages are additionally transmitted to an eavesdropping center with a mobile radio network by a switching center which is used to transmit such data to the communication subscriber to be monitored. Besides these data, it is additionally also possible to transmit data relating to the current or most recently detected location of the communication subscriber, known as IRI ("interception related information") data, to the eavesdropping center. The location data contained in such an IRI data record represent location information for a communication subscriber in the form of the mobile radio cell in which the communication subscriber is currently located or is most recently located, for example.

In the case of conventional telephone services in the landline network, for example, the local fixed association between exchanges and the communication link to be monitored makes this a technically simple matter to implement by identifying the relevant subscriber data record and setting up a multiparty service for the consumer, for example. Thus, eavesdropping measures for a communication subscriber have to date been activated in the local exchange both in line-connected and, at least to some extent, in mobile communication networks using stipulated identity identifiers, for example MSISTN, IMSI, IMEI, SIP URI, Tel URI and E.164.

In contrast to this, problems arise in packet-switched and/or cell-switched, preferably IP-based, communication networks, for example communication networks which support the Internet Protocol (IP), on account of the signaling tasks and the voice data transmission having their functions split over different network components, for example "communication handler" switching nodes and "content handler" switching nodes, however. In this context, there is no prior stipulation regarding the data transmission channel or the switching node which is used to route the voice data from the communication link of a communication subscriber who is to be monitored. The original association between a firmly prescribed data transmission channel and a communication subscriber is no longer provided in this context. Furthermore, the "content handler" switching nodes are not associated on a country-specific basis either, since the data content ("communication content") of a communication link can be transmitted via any, i.e. domestic or foreign, switching node or "content handler" switching node.

By way of example, in a "communication handler" switching node in the form of a "Voice-over-IP (VoIP) server", the signaling data from a communication link for a communication subscriber who is to be monitored are monitored and made available to the associated consumer or the associated eavesdropping center ("Law Enforcement Agency" (LEA)). However, the associated voice data are switched in a further "content handler" switching node whose network address is ascertained dynamically in the "communication handler" switching node in the form of a Voice-over-IP (VoIP) server. Information about the location of the "content handler" switching node handling the voice data traffic is not available in the "communication handler" switching node in the form of a Voice-over-IP (VoIP) server, especially since the network address of the "content handler" switching node involved does not have a country-specific identifier such as an E.164 number, but rather merely an Internet Protocol (IP) address, for example.

In a first step, sufficiently well known eavesdropping measures are used to identify a communication subscriber as the communication subscriber for eavesdropping using at least one identity identifier. Once at least one of the communication subscribers on an existing communication link has been identified as the communication subscriber for eavesdropping, it is necessary to activate a further eavesdropping measure. Before a further eavesdropping measure is activated for the "content handler" switching node switching the voice and/or video data for eavesdropping, however, it is necessary to clarify whether the respective consumer has a valid monitoring instruction for monitoring the data link routed via said "content handler" switching node. Such monitoring instructions for a consumer are limited to a country's territories, however, i.e. eavesdropping measures activated in a "communication handler" switching node or "content handler" switching node situated outside of the country lack any legal basis for an order. Furthermore, there is the risk that confidential information will reach unauthorized third parties abroad as a result.

The object of the present invention is to specify a method for activating eavesdropping measures in a packet-switched and/or cell-switched communication network in which it is possible to avoid activating at least one further eavesdropping measure for a switching node outside of the domain of country-specific legal guidelines.

The invention achieves the object on the basis of the preamble of patent claim 1 by means of the characterizing features of said claim. Developments of the invention are specified in the subclaims.

The fundamental aspect of the invention is that at least the switching nodes provided for activating the eavesdropping measures are respectively assigned at least one activation database which has the identifiers of the switching nodes which are enabled for activating further eavesdropping measures. Only if there is a match between the identifier of the switching node for eavesdropping and at least one identifier contained in the activation database is the further eavesdropping measure activated in the switching node for eavesdropping. In this case, the activation may be both temporary, i.e. only for the existing data communication, or else longer-term, depending on legal guidelines, the respective end of a monitoring instruction being stored when an eavesdropping measure is activated in the communication network. Advantageously, this ensures that when a communication subscriber has been identified as the communication subscriber for eavesdropping, solely those switching nodes which are within the domain of the country-specific legal guidelines of the monitoring instruction have at least one further eavesdropping measure activated.

Figure 2:
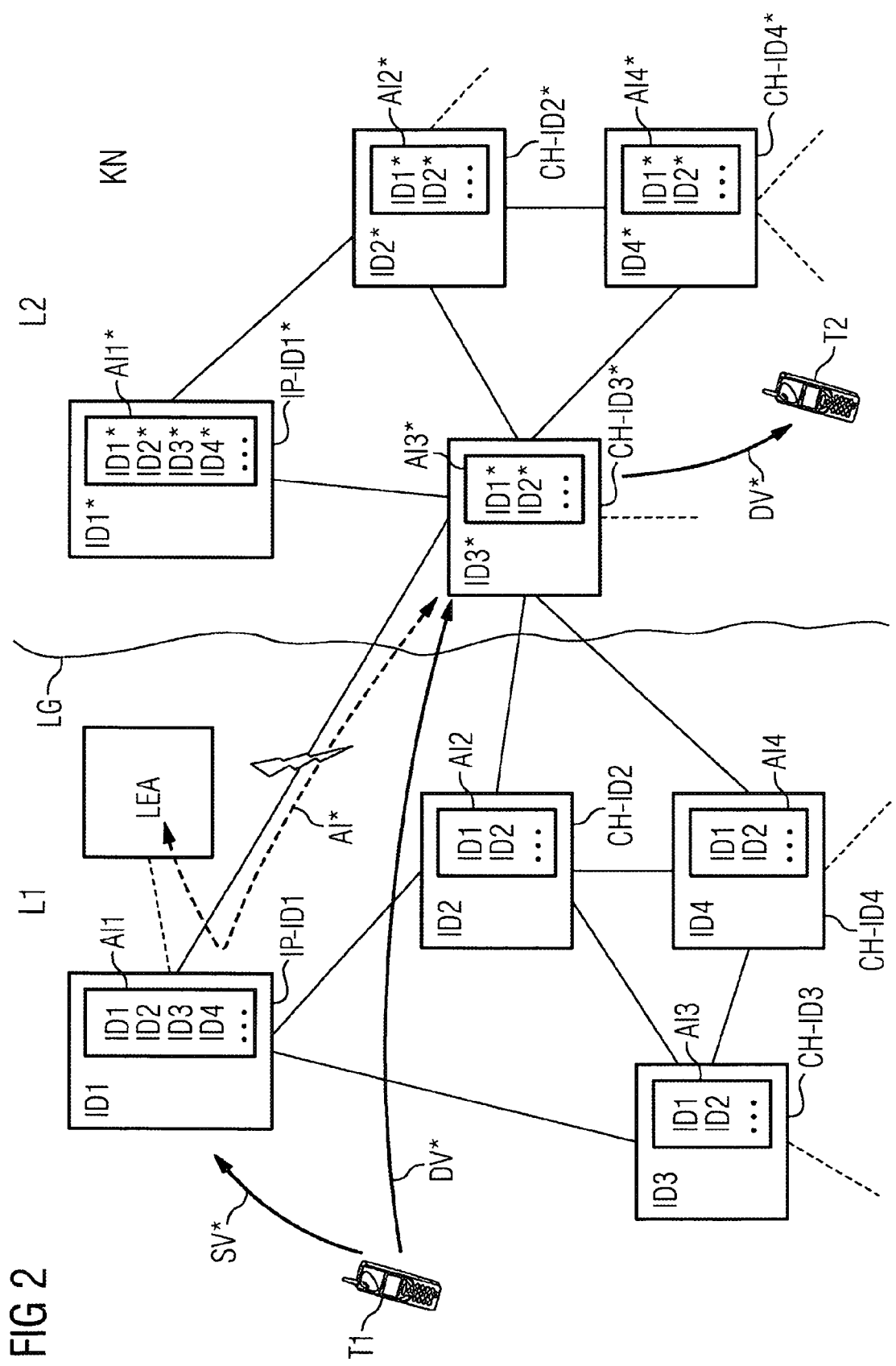

The invention is explained in more detail below using an exemplary embodiment with the aid of drawings, in which:

FIG. 1 shows an example of the flow of activation of an eavesdropping measure in a packet-switched and/or cell-switched communication network, and FIG. 2 shows an example of a configuration which results in the activation of an eavesdropping measure being denied within the packet-switched and/or cell-switched communication network shown in FIG. 1.

FIG. 1 shows a simplified illustration by way of example of a transnational packet-switched and/or cell-switched communication network KN where a first portion of the packet-switched and/or cell-switched communication network KN is arranged in a first country L1, for example Germany, and a second portion of the packet-switched and/or cell-switched communication network KN is arranged in a second country L2, for example Austria.

The packet-switched and/or cell-switched communication network KN also has a multiplicity of switching nodes VoIP-ID1, VoIP-ID1*, CH-ID2-CH-ID4, CH-ID2*-CH-ID4* which are respectively also connected to one another over the national border LG. Every single one of the switching nodes IP-ID1, IP-ID1*, CH-ID2-CH-ID4, CH-ID2*-CH-ID4* has an associated unique identifier ID1-ID4, ID1*-ID4* which, in one preferred embodiment, is in the form of an Internet Protocol (IP) address.

In addition, an authority unit LEA tasked with implementing and evaluating eavesdropping measures is provided which, by way of example, is connected to the packet-switched and/or cell-switched communication network KN or individual switching nodes via data interfaces.

In the packet-switched and/or cell-switched communication network KN, a distinction is drawn between switching nodes responsible for signaling tasks, or "communication handler" switching nodes IP-ID1, IP-ID1* in the form of a "Voice over IP server", for example, and switching nodes responsible for the data transmission tasks, or "content handler" network nodes CH-ID2-CH-ID4, CH-ID2*-CH-ID4*.

At least the "communication handler" switching nodes IP-ID1, IP-ID1* contain a respective dynamic activation database AI1, AI1* preferably in the form of an activation list, which holds the network identifiers ID1-ID4 or ID1* to ID4*, enabled for activating eavesdropping measures, of the "communication handler" switching nodes IP-ID1, IP-ID1* and of the "content handler" switching nodes CH-ID2-CH-ID4, CH-ID2*-CH-ID4*.

In one preferred embodiment, the "content handler" switching nodes CH-ID2-CH-ID4, CH-ID2*-CH-ID4* are enabled on a country-specific basis, i.e. only "content handler" switching nodes CH-ID2-CH-ID4, CH-ID2*-CH-ID4* situated locally in a country L1, L2 are incorporated into an activation database AI1, AI1*. By way of example, in the case of the exemplary embodiment shown in FIG. 1, all identifiers ID1-ID4 concerning the first country L1 are listed in a first activation database AI1 and all identifiers ID1*-ID4* concerning the second county L2 are listed in a second activation database AI1*.

To set up a communication link KV within the packet-switched and/or cell-switched communication network KN from a first communication subscriber T1 to at least one second communication subscriber T2, the first communication subscriber T1 first of all initiates connection setup by sending a connection request to the associated "communication handler" switching node IP-ID1 via a signaling link SV.

By way of example, the connection request comprises the subscriber data required for setting up a communication link KV, i.e. the first communication subscriber's own telephone number and also at least the telephone number of the second communication subscriber T2.

The first or second communication subscribers T1, T2 can communicate either using a mobile or using a fixed communication terminal, for example mobile radios, landline devices, stationary or mobile computers or the like. A wide variety of communication services, particularly multimedia services, are also supported within the telecommunication network TKN.

The "communication handler" switching node IP-ID1 evaluates the transmitted subscriber data and assigns the first communication subscriber T1 a switching node or "content handler" switching node CH-ID3 for the purpose of setting up a data link DV which is used to transmit the communication data ("communication contents"). The "content handler" switching node CH-ID3 is used to set up the associated data link DV to the desired second communication subscriber T2, for example via another "content handler" network node CH-ID4. In this context, there is no prior stipulation regarding which "content handler" network nodes CH-ID2-CH-ID4, CH-ID2*-CH-ID4* is used to route the communication data to the communication link KV.

The communication link KV is first of all split into a signaling link SV and a data link DV as part of the IP-based communication. First of all, the signaling link SV is used to notify the first communication subscriber T1 of the identifier of that "content handler" switching node CH-ID3 which is to be used to set up the data link DV. Next, the desired data link DV is first of all set up from the first to the second communication subscriber T1, T2 and voice data are transmitted over it.

In a further step, a first eavesdropping measure is initiated by the "communication handler" switching node I-ID1, for example, specifically a known eavesdropping method is used to identify those communication subscribers T1, T2 whose communication links KV are to be monitored by evaluating and comparing the subscriber data required for setting up a communication link KV with prescribed eavesdropping information, for example. Further eavesdropping measures for the communication subscribers T1, T2 identified as the communication subscribers for eavesdropping are usually implemented in the first "content handler" switching node CH-ID3 for a communication link KV, specifically this switching node outputs the relevant data links DV of the communication subscriber T1, T2 to be listened to and forwards them as a copy to the appropriate consumer or the authority unit LEA tasked with implementing and evaluating eavesdropping measures.

To activate a further eavesdropping measure of this kind, the "communication handler" switching node IP-ID1 managing the signaling link SV produces an activation information item AI and transmits to the associated "content handler" switching node CH-ID3. In this case, in one preferred embodiment, the activation information item AI is transmitted in a secure mode, preferably encrypted form.

When the activation information item AI has been received in the "content handler" switching node CH-ID3, the prescribed further eavesdropping measure is activated in said switching node. To this end, the activation information item AI contains the information identifying the respective data link DV to be monitored.

In line with the invention, before the respective activation information item AI is produced, the identifier ID3 of that "content handler" switching node CH-ID3 which is used to route the data link DV to be monitored is compared with the identifiers ID1-ID4 which the associated activation database AI1 contains, and only if there is a match between the identifier ID3 of the switching node CH-ID3 to be monitored and at least one identifier ID1-ID4 which the activation database AI contains is the eavesdropping measure activated by producing and transmitting the associated activation information item AI to the "content handler" switching node CH-ID3 to be monitored.

If the data link DV* is set up via an unenabled "content handler" switching node CH-ID3*—as shown by way of example in FIG. 2—then the identifier ID3* of the "content handler" switching node CH-ID3* is compared with the identifiers ID1-ID4 which the activation database AI1 contains and no activation information item AI* is produced and transmitted to the relevant "content handler" switching node CH-ID3* on account of there being no match. Alternatively, the activation information item AI* can be forwarded as a failed activation information item to the relevant consumer or the authority unit LEA tasked with implementing and evaluating eavesdropping measures.

The activation databases AI1, AI1* are updated dynamically. In addition, different activation databases AI1, AI1* containing data entries which are dependent on the type of eavesdropping measures to be activated can in the respective "communication handler" switching nodes IP-ID1, IP-ID1* for different eavesdropping measures.

In another embodiment, not only the "communication handler" switching nodes IP-ID1, IP-ID1* but also the "content handler" switching nodes CH-ID2-CH-ID4, CH-ID2*-CH-ID4* in the packet- and/or cell-switched communication network KN contain activation databases AI2-AI4, AI2*-AI4*, which are likewise updated dynamically. On the basis of the activation data in the "content handler" switching nodes CH-ID2-CH-ID4, CH-ID2*-CH-ID4*, in one alternative embodiment, the "content handler" switching node CH-ID2-CH-ID4, CH-ID2*-CH-ID4* itself can verify whether it has been enabled for activation of the further eavesdropping measures.

The eavesdropping measure can be activated for the duration of an existing data link DV or else for another prescribed period.

The invention has been described in more detail above with the aid of an exemplary embodiment. It goes without saying that numerous modifications and variations are possible without thereby departing from the inventive concept on which the invention is based.

LIST OF REFERENCE SYMBOLS

AI, AI* Activation information.
AI1, AI1* Activation database
AI2, AI2* Further activation databases
AI3, AI3* Further activation databases
AI4, AI4* Further activation databases
CH-ID2*,3*,4* "Content handlers" switching node
CH-ID2,3,4 "Content handlers" switching node
DV, DV* Data link
ID1, ID1* Identifier
ID2, ID2* Identifier
ID3, ID3* Identifier
ID4, ID4* Identifier
IP-ID1,1* "Communication handler" switching node
KN Telecommunication network
KV Communication link
L1 First country
L2 Second country
LEA Authority unit
LG National border
SV, SV* Signaling link
T1 First communication subscriber
T2 Second communication subscriber

The invention claimed is:

1. A method, comprising:
activating at least one further eavesdropping measure in at least one switching node in a packet-switched and/or cell-switched communication network, comprising a plurality of switching nodes, for the purpose of eavesdropping on at least one data link which exists between two communication subscribers, the individual switching nodes in the communication network having respective associated unique identifiers, and in which at least one of the two communication subscribers is identified as the communication subscriber for eavesdropping by at least one eavesdropping measure, wherein the activating comprises:
respectively assigning the switching nodes, provided for activating the at least one further eavesdropping measure that is in addition to the at least one eavesdropping measure, at least one activation database which has the identifiers of the switching nodes enabled for activating further eavesdropping measures; and
activating the further eavesdropping measure in the switching node only if there is a match between the identifier of the switching node for eavesdropping and at least one identifier contained in the activation database.

2. The method as claimed in claim 1, further comprising:
activating the further eavesdropping measures either in a switching node in the form of a communication handler switching node or in a switching node in the form of a content handler switching node.

3. The method as claimed in claim 2, further comprising:
providing activation databases both in the communication handler switching node and in the content handler switching node.

4. The method as claimed in claim 3, further comprising:
activating the eavesdropping measures by identifying the communication subscribers as communication subscribers for eavesdropping by means of stipulated identity identifiers, for example MSISTN, IMSI, IMEI, SIP URI, Tel URI, IP, and/or cell addresses and E.164.

5. The method as claimed in claim 2, further comprising:
activating the further eavesdropping measure by producing in the associated communication handler switching node at least one activation information item and transmitting the at least one activation information item to the content handler switching node for eavesdropping.

6. The method as claimed in claim 5, wherein the activation information is transmitted in an encrypted form.

7. The method as claimed in claim 2, further comprising:
controlling a setup, maintenance and cleardown of a communication link via a signaling link which is managed by the communication handler switching nodes.

8. The method as claimed in claim 2, further comprising:
comparing the identifier of the content handler switching node via which the data link for eavesdropping is routed with the identifiers contained in the associated activation database; and
if there is a match between the identifier of the content handler switching node for eavesdropping and at least one identifier contained in the activation database, activating the further eavesdropping measure.

9. The method as claimed in claim 8, further comprising:
forwarding a copy of the data link routed via the switching node for eavesdropping to the appropriate consumer or authority unit tasked with implementing and evaluating eavesdropping measures.

10. The method as claimed in claim 8, further comprising:
if there is no match between the identifier of the switching node for eavesdropping and at least one identifier contained in the activation database, forwarding an information item about failure of the activation of the eavesdropping measure to the appropriate consumer or authority unit tasked with implementing and evaluating eavesdropping measures.

11. The method as claimed in claim 1, further comprising:
selecting the identifiers stored in the activation database on a country-specific basis.

12. The method as claimed in one of claim 1, further comprising:
implementing the activation databases as continually updated activation lists.

13. The method as claimed in claim 1, further comprising:
activating the eavesdropping measure for the existing data link or else for a prescribed period.

14. The method as claimed in claim 1, wherein the data link is used to transmit audio, video or other multimedia data and also short messages.

15. The method as claimed in claim 1, wherein there are different activation databases for different eavesdropping measures.

16. An apparatus comprising:
an initiator configured to initiate a first eavesdropping measure;
a selector configured to select a switching node to implement a further eavesdropping measure that is in addition to the first eavesdropping measure;
a comparator configured to compare the identifier of the selected switching node with identifiers contained in an associated activation database; and
an activator configured to activate the further eavesdropping measure if there is a match between the identifier of the selected switching node and at least one of the identifiers contained in the associated activation database.

17. The apparatus as claimed in claim 16, further comprising a transmitter configured to transmit an activation information item to the switching node in order to activate the further eavesdropping measure.

18. The apparatus as claimed in claim 17, wherein the activation information item comprises information identifying a data link to be monitored.

19. The apparatus as claimed in claim 18, wherein the data link is configured to transmit audio, video, or other multimedia data and short messages.

20. The apparatus as claimed in claim 17, wherein the activation information is transmitted in an encrypted form.

21. The apparatus as claimed in claim 16, wherein the identifiers contained in the activation database are selected on a country-specific basis.

22. The apparatus as claimed in claim 16, wherein the activation databases are implemented as continually updated activation lists.

23. The apparatus as claimed in claim 16, wherein the eavesdropping measure is configured to be activated for the existing data link or for a prescribed period.

24. The apparatus as claimed in claim 16, wherein there are different activation databases for different eavesdropping measures.

25. A method comprising:
initiating a first eavesdropping measure;
selecting a switching node to implement a further eavesdropping measure that is in addition to the first eavesdropping measure;
comparing the identifier of the selected switching node with identifiers contained in an associated activation database; and
activating the further eavesdropping measure if there is a match between the identifier of the selected switching node and at least one of the identifiers contained in the associated activation database.

26. The method as claimed in claim 25, further comprising transmitting an activation information item to the switching node in order to activate the further eavesdropping measure.

27. The method as claimed in claim 26, wherein the activation information item comprises information identifying a data link to be monitored.

28. An apparatus comprising:
initiating means for initiating a first eavesdropping measure;
selecting means for selecting a switching node to implement a further eavesdropping measure that is in addition to the first eavesdropping measure;
comparing means for comparing the identifier of the selected switching node with identifiers contained in an associated activation database; and
activating means for activating the further eavesdropping measure if there is a match between the identifier of the selected switching node and at least one of the identifiers contained in the associated activation database.

* * * * *